May 26, 1970   J. P. CAVANAUGH ET AL   3,514,081
MAGNETIC STIRRERS AND METHOD FOR MAKING SAME
Filed Feb. 6, 1968
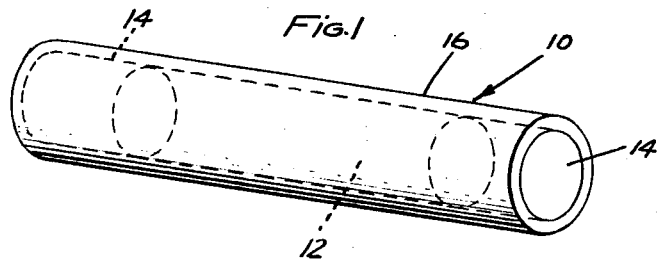
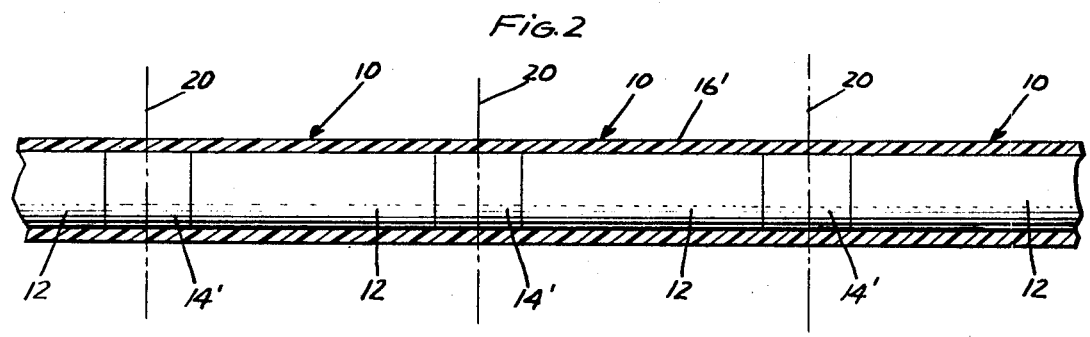
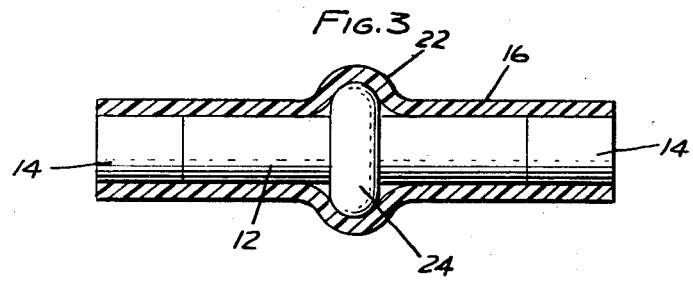
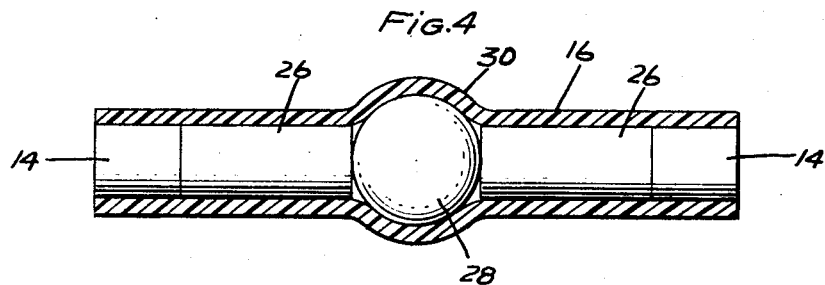
INVENTORS:
JAMES P. CAVANAUGH,
EUGENE P. GUGEL,
WILLIAM S. SHAMBAN.
BY: Hood, Gust & Irish
ATTORNEYS

United States Patent Office 3,514,081
Patented May 26, 1970

3,514,081
MAGNETIC STIRRERS AND METHOD FOR MAKING SAME
James P. Cavanaugh and Eugene P. Gugel, Fort Wayne, Ind., and William S. Shamban, Pacific Palisades, Calif., assignors to W. S. Shamban & Co., Fort Wayne, Ind., a corporation of Indiana
Filed Feb. 6, 1968, Ser. No. 703,420
Int. Cl. B01f *13/08;* B32b *27/08*
U.S. Cl. 259—114
10 Claims

ABSTRACT OF THE DISCLOSURE

An encapsulated stirrer and method for making same, the stirrer comprising a rod-like member, a plastic plug abutting each end of the member and a heat-shrinkable plastic tube tightly and perimetrally gripping the member and plugs, the tube being sealably joined about the perimeter of each of the plugs hermetically to seal the member in the tube. The method comprises the steps of inserting the member into a heat-shrinkable plastic tube, inserting plastic plugs into the tube, one plug abutting each end of the member, and heat treating the plastic tube thereby to shrink the tube onto the member and the plugs and sealably to join the tube perimetrally to each of the plugs.

BACKGROUND OF THE INVENTION

Field of the invention

The present invention relates generally to magnetic stirrers, and more particularly to an encapsulated metallic, rod-like member and a method for fabricating encapsulated rod-like members. Such stirrers are used in magnetic stirring systems wherein a liquid is stirred by means of a stirring bar placed therein and driven by a rotating magnetic field.

Description of the prior art

Magnetic stirring bars are well known. The prior art discloses various schemes for encapsulating magnetic stirrers to preclude reactions between certain liquids and the metallic material comprising the magnet. Usually, the stirrer comprises a metallic, rod-like member which is encapsulated with a relatively inert substance such as tetrafluoroethylene, polytetrafluoroethylene, fluorinated ethylene polymer, polyethylene, or monochlorotrifluoroethylene. Tetrafluoroethylene and polytetrafluoroethylene are commonly referred to by the trademark "Teflon."

One of the disadvantages of prior art magnetic stirrers is that they are not easily fabricated. That is, prior art stirrers have not been constructed so that the rod-like member can be easily, yet effectively, encapsulated.

SUMMARY OF THE INVENTION

The present invention comprises an encapsulated stirrer and a method for making the same. The stirrer comprises a metallic, rod-like member, a plastic plug abutting each end of the member, and a heat-shrinkable plastic tube tightly and perimetrally gripping the member and the plugs, the tube being sealably joined about the perimeter of each of the plugs hermetrically to seal the member in the tube. In a preferred embodiment of the present invention, the rod-like member and the plugs are cylindrical and the diameter of the plugs is substantially equal to the diameter of the member. Thus, by placing the axes of such plugs coincident with the axis of the rod-like member, the resulting stirrer is a cylindrically shaped body having a plastic outer surface.

In another preferred embodiment of the present invention, a perimetrally extending ridge is formed on the rod-like member intermediate its ends. The ridge, which is encapsulated by the plastic tube, provides a protruding, perimetrally extending surface on which the stirrer may swivel as it rotates in a cooking container or the like.

In still another preferred embodiment of the present invention, a pair of aligned rod-like members are separated by a spherical member having a diameter which is greater than the diameter of the rod-like members, and all three members are encapsulated. In such an embodiment, the spherical member provides a protruding surface on which the magnetic stirrer swivels when it rotates in a container.

The method of the present invention comprises the steps of inserting a rod-like member into a heat-shrinkable plastic tube, inserting plastic plugs into the tube, one plug abutting each end of the rod-like member, and heat treating the plastic tube thereby to shrink the tube onto the member and the plugs and sealably to join the tube perimetrally to each of the plugs.

The method of the present invention is ideally suited for encapsulating quantities of rod-like members by inserting a plurality of such members and a plurality of plastic plugs into a heat-shrinkable plastic tube, the axes of the members and the plastic plugs generally coinciding with the axis of the tube, adjacent members being spaced apart by one of the plastic plugs. One end of the tube so filled is closed and the tube is evacuated and then heat treated. The evacuation and heat treatment of the tube causes the tube to shrink onto the members and the plastic plugs and to be sealably joined to each of the plastic plugs. The encapsulated rod-like mmebers are then separated by cutting through the tube and the plugs on planes normal to the axes of the plugs and intermediate the ends of the plugs.

It is an object of the present invention, therefore, to provide a magnetic stirrer comprising a rod-like member enclosed in a heat-shrinkable plastic tube sealed at its ends by plastic plugs.

Another object of the present invention is to provide a method for easily fabricating such magnetic stirrers.

BRIEF DESCRIPTION OF THE DRAWINGS

The above-mentioned and other features and objects of this invention and the manner of attaining them will become more apparent and the invention itself will be best understood by refrerence to the following description of an embodiment of the invention taken in conjunction with the accompanying drawings wherein:

FIG. 1 is a perspective view of the magnetic stirrer fabricated in accordance with the method of the present invention;

FIG. 2 is a fragmentary, longitudinally sectioned view of a heat-shrinkable plastic tube containing a plurality of metallic, rod-like members and plastic plugs, adjacent members being separated by a plastic plug;

FIG. 3 is a longitudinally sectioned view showing another embodiment of the magnetic stirrer provided with a perimetrally extending ridge intermediate the ends thereof; and FIG. 4 is a longitudinally sectioned view of still another embodiment of the present invention, this stirrer comprising a pair of metallic, rod-like members separated by a spherical member having a diameter greater than the rod-like members.

DESCRIPTION OF THE PREFERRED EMBODIMENTS

In the conventional magnetic stirring apparatus, a vessel containing a liquid or other fluid material to be mixed is placed above a rotatably driven magnet, and a stirring bar, commonly called a magnetic stirrer, is placed in the vessel. As the magnet is rotated, the stirring bar will tend to rotate in order to follow the magnetic field set up by the rotatably driven magnet. The rotation of the stirring bar within the liquid contained in the vessel will agitate the liquid and cause the mixing thereof.

The magnetic stirrer of the present invention, indicated generally by the reference numeral 10, comprises a metallic rod-like member 12, two plastic plugs 14 abutting the opposite respective ends of the member 12, and a heat-shrinkable plastic tube 16 tightly and perimetrally gripping the member 12 and the plugs 14. In the preferred embodiment of the present invention, the member 12 and the plugs 14 are cylindrically shaped and the diameter of the plugs 14 is substantially equal to the diameter of the member 12. As shown in FIG. 1, the axes of the member 12, plugs 14, and tube 16 are coextensive so that the stirrer 10 is a cylindrically shaped body.

The stirrer 10 may be fabricated by inserting the rod-like member 12 into the tube 16 and, then, inserting the plastic plugs 14 into the tube 16, one plug abutting each end of the member 12. With the member 12 and plugs 14 in an abutting relationship, the tube 16 is heat treated to shrink the tube 16 onto the member 12 and the plugs 14 and sealably to join the tube 16 perimetrally to each of the plugs. By joining the tube 16 perimetrally to each of the plugs 14, the member 12 is thereby hermetically sealed inside the tube.

The rod-like member 12 may be a conventional bar magnet having a north pole at one end and a south pole at the other end. Thus, the rod-like member 12 may be fabricated from any one of several suitable permanent magnet materials such as one of the cobalt or tungsten magnetic alloys. Since the plugs 14 and tube 16 are plastic, the rod-like member 12 may be magnetized either before or after the member 12 is encapsulated.

It may be desirable not to magnetize the rod-like member 12. That is, the stirrer 10 will be rotated by a rotating magnetic field if the member 12 is an ordinary steel rod.

The tube 16 may be fabricated from any number of well known plastic materials such as tetrafluoroethylene, vinylidene fluoride, polyvinyl chloride, and polyethylene. Of course, the plugs 14 must be fabricated of a material which can be easily bonded or joined to the tube 16 by the application of heat, thereby to seal hermetically the number 12.

In one preferred embodiment of the present invention, the plugs 14 are fabricated from fluorinated ethylene propylene and the tube 16 is fabricated from tetrafluoroethylene.

Referring now to FIG. 2, it will be seen that a plurality of stirrers 10 can be fabricated by inserting a plurality of members 12 and plugs, herein designated as 14', into a length of heat-shrinkable plastic tubing, herein designated as 16', adjacent members 12 being spaced apart by a plug 14'. Preferably, the internal diameter of the tubing 16' is approximately fifty thousandths (0.050) of an inch greater than the diameter of the members 12 and the plugs 14' for tubing of 3/32" I.D. and 1/8" O.D. With the members 12 and plugs 14' in the length of tubing 16' as shown in FIG. 2, one end of the tubing 16' is closed by clamping the tubing to a plug 14' which is adjacent the end and the tubing is then evacuated by conventional means. After the length of tubing 16' is evacuated, heat is applied to the tubing 16' to shrink it onto the members 12 and plugs 14' and to join it perimetrally to each of the plugs 14'. In some cases, depending on the type of material used for the plugs 14' and the tubing 16', the tubing 16' may be fused perimetrally about each of the plugs 14'.

After the tubing 16' is joined to each of the plugs 14' as just described, the individual stirrers 10 may be separated by cutting through the tubing 16' and each of the plugs 14' on planes 20 which are normal to the axes of the members 12 and plugs 14' and intermediate the ends of its respective plug 14'.

A working embodiment of the stirrer of FIG. 1 made according to this invention has the dimensions and materials as follows:

Tubing 16—3/32" I.D. 1/8" O.D.
Rod 12 length—1 1/2"
Plug 14 length—1/4"
Rod 12, plug 14 diameter—.050" larger than 1.0 of tubing 16
Tubing 16 material—tetrafluoroethylene
Plug 14 material—fluorinated ethylene propylene
Shrinking temperature—630° F. to cause bonding of tubing 16 to plugs 14

In the heat-shrinking process, the tubing 16 bonds or fuses to the plugs 14 thereby providing an air-tight seal.

Referring now to FIG. 3, a stirrer fabricated in accordance with the present invention and having a perimetrally extending ridge 22 will be discussed. The stirrer of FIG. 3 is fabricated in the same manner as the stirrer 10 except that a ring-like element 24 is placed on the rod-like member 12 intermediate its ends. The element 24 provides a perimetrally extending ridge on the member 12 and under the tube 16. Thus, when the tube is drawn down onto the member 12 and the plugs 14, the ridge 22 is formed. The purpose of the ridge 22 is to provide a center of rotation for the stirrer of FIG. 3. Thus, the element 24 is preferably placed near the longitudinal center of the member 12. It will also be apparent that the member 12 may be machined or otherwise formed to have a perimetrally extending ridge intermediate its ends.

Referring now to FIG. 4, still another embodiment of the present invention will be discussed. In the embodiment of FIG. 4, a pair of metallic, rod-like members 26, a pair of plastic plugs 14 and a spherical metallic or non-metallic, magnetic or non-magnetic member 28 are inserted into the heat-shrinkable plastic tube 16. Preferably, the diameter of the spherical member 28 is greater than the diameter of the plugs 14 and the members 26. Thus, when the tube 16 is shrunk down onto the plugs 14, members 26 and the spherical member 28, the stirrer so formed is provided with a perimetrally extending ridge 30 on which the stirrer may swivel when it is rotated by a magnetic field. In the embodiment of FIG. 4, the spherical member 28 is placed between the innermost ends of the members 26 and a plastic plug 14 abuts each of the outermost ends of the members 26. Thus, if the plugs 14 are of the same length and the members 26 are of the same length, the ridge 30 will be at the longitudinal center of the stirrer of FIG. 4.

It will be apparent that the stirrer 10 as well as the stirrers of FIG. 3 and FIG. 4 are constructed so that there are no loose parts therein. For instance, in the stirrer 10, the member 12 and the plugs 14 are gripped tightly by the tube 16 so that there will be no relative movement between the member 12 and the plugs 14.

It will also be apparent that by fabricating the tube 16 and the plugs 14 from tetrafluoroethylene or polytetrafluoroethylene or the like, the exterior of the stirrer 10 will be chemically inert. Of course, tetrafluoroethylene, polytetrafluoroethylene and fluorinated ethylene polymer are characterized by their high lubricity and, therefore, the stirrer 10 should rotate easier than a magnetic bar which is uncoated.

While there have been discussed above the principles of this invention in conjunction with specific apparatus, it is to be clearly understood that this description is made by way of example and not as a limitation to the scope of the invention.

What is claimed is:

1. An encapsulated stirrer comprising a rod-like member, two plastic plugs abutting the opposite ends, respectively, of said member, and a heat-shrinkable plastic tube tightly and perimetrally gripping said member and said plugs, said tube being sealably joined about the perimeter of each of said plugs hermetically to seal said member in said tube, said tube and plugs being of materials which are fusible with heat, said tube being evacuated.

2. An encapsulated stirrer as in claim 1 wherein said rod-like member has a perimetrally extending ridge located intermediate the ends of said member.

3. A stirrer as in claim 1 wherein said member and said plugs are cylindrically shaped and wherein the diameter of said plugs is substantially equal to the diameter of said member.

4. An encapsulated stirrer comprising a pair of generally cylindrical rod-like members, a generally spherically shaped member having a diameter greater than the diameter of said rod-like members, the axes of said rod-like members substantially coinciding, said spherically shaped member being disposed between adjacent ends of said rod-like members, the coinciding axes of said rod-like members extending substantially through the center of said spherically shaped member, two plastic plugs abutting said rod-like members at the ends thereof opposite said spherically shaped member, and a heat-shrinkable plastic tube tightly and perimetrally gripping said plugs, said rod-like members and said spherically shaped member, said tube being sealably joined about the perimeter of each of said plugs hermetically to seal said members in said tube.

5. The method of encapsulating a rod-like member comprising the steps of inserting said member into a heat-shrinkable plastic tube, inserting a pair of plastic plugs into said tube, into abutting engagement with the opposite ends of said member, respectively, and heat treating said plastic tube thereby to shrink it onto said member and said plugs and to fuse and bond said tube perimetrally to said plugs, said plugs being of a material which fuses and bonds to said tube as a consequence of said heat treatment.

6. The method of claim 5 further comprising the step of evacuating said tube before heat treating, said tube having an inside diameter larger than said member and plugs whereby said evacuation draws said tube inwardly.

7. The method of encapsulating rod-like members comprising the steps of inserting a plurality of said members and a plurality of plastic plugs in alternated relation into a heat-shrinkable plastic tube, adjacent members being spaced apart by one of said plugs, closing one end of said tube, evacuating said tube, heat treating said tube thereby to shrink said tube onto said members and said plugs and sealably to join said tube perimetrally to each of said plugs, and cutting through said tube and said plugs intermediate the ends of said plugs.

8. The method of claim 7 wherein the step of closing one end of said tube comprises the step of clamping tightly said one end of said tube to the plastic plug adjacent said one end, thereby hermetically sealing said one end of said tubing.

9. The method of claim 7 in which said member is cylindrical and of magnetic material, said tube is of tetrafluoroethylene material and said plugs are of fluorinated ethylene polymer, the heat treating step being performed at a temperature of about 630° F. for fusing said tube to said plugs.

10. A stirrer as in claim 1 in which the material of said tube includes tetrafluoroethylene and the material of said plugs include fluorinated ethylene polymer, said plugs being fused and bonded perimetrally to the contiguous inner periphery of said tube thereby encapsulating said member within an envelope of uninterrupted substantially continuous plastic.

References Cited

UNITED STATES PATENTS

| | | | |
|---|---|---|---|
| 2,844,363 | 7/1958 | Clark | 259—144 |
| 2,951,689 | 9/1960 | Asp et al. | 259—144 |
| 2,972,784 | 2/1961 | Shonka et al. | 264—112 |
| 3,088,716 | 5/1963 | Stott | 259—144 |

FOREIGN PATENTS

| | | |
|---|---|---|
| 991,941 | 6/1951 | France. |

WILLIAM I. PRICE, Primary Examiner

U.S. Cl. X.R.

156—86